United States Patent Office 3,523,975
Patented Aug. 11, 1970

3,523,975
PROCESS FOR PREPARING ALKENYL DISULFIDES AND ALKENYL TRISULFIDES
William John Evers, Long Branch, and Jack Herbert Blumenthal, Ocean Township, Monmouth County, N.J., assignors to International Flavors & Fragrances, Inc., New York, N.Y., a corporation of New York
No Drawing. Filed Apr. 26, 1968, Ser. No. 724,605
Int. Cl. C07c 149/12; A23l 1/26
U.S. Cl. 260—608                           9 Claims

ABSTRACT OF THE DISCLOSURE

Process for preparing alkenyl disulfides and alkenyl trisulfides such as methyl propenyl disulfide, propyl propenyl disulfide, methyl propenyl trisulfide, propyl propenyl trisulfide, and the like. The process involves the reaction between an alkali metal 1-alkene or an alkaline earth metal 1-alkene halide with an appropriate alkyl substituted di- or trisulfur halide.

FIELD OF INVENTION

This invention relates to preparation of alkyl-1-alkenyl disulfides and trisulfides and to the novel alkyl alkenyl trisulfides obtained thereby.

DESCRIPTION OF PRIOR ART

A wide variety of organic disulfides and trisulfides are known, typical among which are both the symmetrical and unsymmetrical saturated and unsaturated disulfides such as dimethyl disulfide, dimethyl trisulfide, dipropyl disulfide, methyl propyl disulfide, methyl propyl trisulfide, diallyl disulfide, allyl propyl disulfide, methyl allyl disulfide and the like. Such compounds are easily synthesized using a variety of synthetic routes. Heretofore, the art has been unsuccessful in achieving a good synthetic route to alkyl-1-alkenyl disulfides and trisulfides and it would be desirable indeed to provide a reliable synthetic means for producing said compounds.

The prior art techniques for producing unsaturated sulfides have generally centered around oxidative reactions using appropriately substituted mercaptans in an iodine oxidation, or by exchange between an appropriate mercaptan and allyl mercaptan. These methods have been found to be unsuitable for preparing the 1-alkenyl compounds, as indeed, have been direct attempts at isomerizing the corresponding allyl compounds.

SUMMARY OF THE INVENTION

It has now been discovered that alkyl-1-alkenyl disulfides and trisulfides can be prepared directly by reacting an alkali metal alkene or an alkaline earth metal alkenyl halide with an appropriate alkyl substituted disulfur or trisulfur halide. The reaction is depicted as follows:

(I)
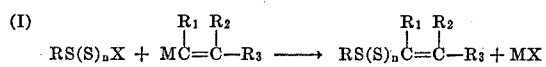

where R and $R_3$ are alkyl and $R_1$ and $R_2$ are hydrogen or alkyl, said alkyl being especially lower alkyl such as methyl, ethyl, n-propyl, isopropyl, butyl, sec.-butyl, n-pentyl and the like, X is halogen, preferably chloro or bromo and M is MgBr, MgCl or lithium, preferably MgBr and $n$ is 1 or 2. Typical of the sulfide starting materials are methyl disulfur chloride, methyl trisulfur chloride, ethyl disulfur chloride, n-propyl disulfur chloride, n-propyl trisulfur chloride, n-pentyl disulfur chloride, and the corresponding bromides. Most preferred among these are methyl disulfur chloride and n-propyl disulfur chloride, methyl trisulfur chloride and propyl trisulfur chloride. Most preferably, $R_1$ and $R_2$ are hydrogen and $R_3$ is methyl.

Reaction I is highly exothermic and is preferably run in the cold and under anhydrous conditions. Temperatures below room temperature and more suitably between about −80° C. to 10° C. are suitable. The reaction is preferably run in the presence of a solvent as a reaction vehicle, anhydrous solvents having low freezing points being generally employed. Typical of such solvents are ethers, such as diethyl ether, tetrahydrofuran, and diisopropyl ether, or hydrocarbons such as hexane, benzene, toluene, and the like. In practice it is generally found suitable to use the solvent system in which the propenyl magnesium compound was itself prepared as will be described hereinafter.

With regard to the relative amounts of reactants employed, it is preferred for reasons of economy to use stoichiometric quantities although an excess of one or the other of the reactants may be made. As a result of the reaction, the desired alkyl-1-alkenyl disulfide or trisulfide is obtained in solution. They may be separated and recovered from the reaction mixture by conventional techniques such as distillation and the like. They are preferably separated therefrom by evaporation of the solvent vehicle, and submission of the resulting crude oil to chromatographic separation techniques.

Both the lithium or magnesium alkenyl compounds and the alkyl disulfur or trisulfur compounds used as starting materials in the foregoing reaction, are themselves prepared by known processes. The following equations represents the formation of the alkenyl compound using propenyl halide for illustrative purposes:

(II)   $XCH=CHCH_3 + 2Li \rightarrow LiCH=CHCH_3 + Lix$ (III) 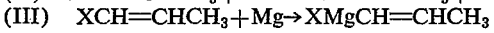 $XCH=CHCH_3 + Mg \rightarrow XMgCH=CHCH_3$ wherein X is a halogen atom preferably chloro or bromo, and most preferably bromo.

The reactions are preferably carried out under anhydrous conditions and in the presence of a solvent. The solvent is suitably one which can be used in the subsequent reaction of the alkenyl compound with the alkyl disulfur or trisulfur halide as described above in Reaction I. The reaction is exothermic and is preferably carried out under gentle reflux conditions caused autogenically by controlled addition of the halo-alkene compound to a slurry of the alkali or alkaline earth metal in the solvent.

With regard to relative amounts of reactants, it is preferred to use stoichiometric quantities although excesses of either reagent may be used. The resulting propene is obtained in solution from which it may be separated using conventional techniques. It is preferred, however, to use the reaction mixture without further treatment in the subsequent reaction with the alkyl disulfur or trisulfur halide.

The alkyl disulfur halide is itself prepared by a process involving cleavage of an appropriate alkyl trisulfide with a strong halogenating agent. Especially preferred halogenating agents are sulfuryl chloride, chlorine and bromine.

The reaction is depicted by the following equation, shown for convenience using sulfuryl chloride as the halogenating agent:

(IV)  $RSSSR + SO_2Cl_2 \rightarrow RSCl + RSSCl + SO_2$ where R is alkyl as previously described.

The starting trisulfides need not be symmetrically substituted; that is, the radicals R may be different alkyls. Symmetrical substitution is highly preferred, however, since the cleavage of a symmetrical trisulfide will result in only two sulfur halides rather than the four which are possible in the case of an unsymmetrical alkyl trisulfide starting material. The alkyl substitution is, of course selected on the basis of the nature of the alkyl radical desired in the final alkenyl sulfide produced in Reaction I. The preferred trisulfides are dimethyl trisulfide and di-n-propyl trisulfide, although the diethyl, dibutyl di-sec.-butyl and di-n-pentyl trisulfides may be employed as well. Alternatively, alkyl di- or tri- sulfur halides are prepared by halogenation of an appropriate alkyl acetyl di- or trisulfide as follows:

(V) $RS(S)_nCOCH_3 + SO_2Cl_2 \rightarrow RS(S)_nCl + CH_3COCl + SO_2$

Other halogenating agents as described above may also be used. The reaction results in the cleavage of the acetyl compound and yields the halogenated di- or trisulfide.

The above reactions are preferably carried out below room temperature and most preferably between $-35°$ to $40°$ C. It is preferred to carry out the reaction by adding the halogenating agent to the sulfide without the use of a solvent, although one may be used if desired. Solvents such as hexane, benzene, and isopentane are suitable. With regard to the amounts of reactants, it is preferred for reasons of economy to use the stoichiometric quantities.

As a result of the reactions, the di- or trisulfur halides are obtained in solution and are then available for reaction with the substituted alkene in Reaction I. The starting materials used in the foregoing Reactions may be all cis, all trans or any combination of the cis and trans isomeric forms.

Representative of the compounds of the invention are:

methyl (2-methyl propenyl) trisulfide
propyl (2-methyl propenyl) trisulfide,
ethyl (2-ethyl propenyl) trisulfide,
methyl propenyl trisulfide,
propyl propenyl trisulfide,
ethyl propenyl trisulfide,
methyl propenyl disulfide,
propyl propenyl disulfide,
methyl (2,2-dimethyl propenyl) disulfide,
propyl (2,2-dimethyl propenyl) disulfide, and the like in both cis or trans or mixtures of cis and trans isomeric forms.

The alkyl-1-alkenyl disulfides of the present invention are useful in the field of food flavoring. They possess a characteristic cooked onion aroma and impart an onion flavor to foods. They thus constitute a suitable artificial means for flavoring edible materials. Such items as sauces, purees, gravies, dips, meats and meat products and other foods wherein an onion flavor and aroma is desired may all be treated.

The compounds are typically used at levels of from $10^{-5}$ to $10^{-2}$ percent by weight based on the weight of the entire food item to be treated. The particular amount selected will depend on individual preferences in the case of home consumer use or on mass appeal considerations in the case of bulk food processing. They may be employed alone or in combination with other disulfides, such as dialkyl disulfides illustrated by dimethyl disulfide, dipropyl disulfide, methyl propyl disulfide and the like; carriers such as vegetable oil, cottonseed oil, corn oil, starch, salt, sugar, gum arabic, and the like. In composition form they are conveniently used at between .01 to 20 percent by weight with the remainder being carriers or other adjuvants. They may also be used alone, however.

The trisulfides find use in enhancing the flavor, odor and aroma developed by the alkenyl disulfides to produce a synthetic onion flavoring composition which imparts an onion flavor to foods virtually indistinguishable from the natural product. They are normally used in conjunction with the alkenyl disulfide at levels ranging from 1 to 20 and preferably 3 to 6 times the weight of the alkenyl disulfide used. The presence of these trisulfides gives a more fully developed character to the flavor produced. No additional carrier or adjuvants are necessary but they may be employed as described above if desired.

Suitable compositions contain from 0.005 to 20 weight percent of the 1-alkenyl disulfide, from 0.005 to 95 weight percent of the 1-alkenyl trisulfide and 0.1 to 99.99 weight percent of a carrier. Said compositions are conveniently employed in foods in sufficient amount to provide from $10^{-5}$ to $10^{-2}$ weight percent based on the entire amount of food to be treated. Levels outside this range, however, may be used depending on individual tastes.

The invention will now be described with reference to specific embodiments thereof.

Example I.—Preparation of propenyl lithium

Materials:
6.0 g.—(0.05 M) 1-bromo-1-propene (distilled mixture of cis and trans isomers).
1.1 g.—(0.15 gram-atom)—Lithium wire (low sodium content).
75 ml.—Ethyl ether (dried over sodium).

The reaction vessel consisting of a 100 ml., 3-neck round bottom flask, addition funnel, calcium chloride drying tube, nitrogen inlet tube, stirrer, and reflux condenser, is thoroughly dried in vacuo at 105° C., allowed to cool, assembled and flushed with nitrogen. A slight positive pressure of nitrogen is kept in the reaction system throughout the subsequent reaction. A slurry of finely cut lithium wire (1.1 g.) in 75 ml. of ethyl ether is then added to the reaction flask and vigorous stirring is begun. About 20% of the 1-bromo-1-propene is next added at once to initiate the reaction. Initiation of reaction is indicated by cloudiness in the reaction mixture. After a few minutes, the reaction mixture begins to reflux and the remainder of the bromide is then added at a rate to maintain gentle reflux. Total addition time is 35 minutes. The reaction mixture is next allowed to reflux for an additional 45 minutes, cooled and then stored under nitrogen until ready for use.

Similar results are obtained when 1-chloro-1-propene is used in place of 1-bromo-1-propene in the above procedure.

Example II.—Preparation of methyl disulfur chloride

Materials: G.
Dimethyl trisulfide (distilled) _____ 5.5 (0.044 M)
Sulfuryl chloride (distilled) _____ 5.9 (0.044 M)

Quartz equipment is heated for 1 hour at 105° C. in vacuo. After cooling, the joints are all sealed with phosphoric acid (85%) and the entire system then flushed with dry hydrogen chloride gas.

The dimethyl trisulfide is then cooled to $-20°$ C. and the sulfuryl chloride is then added. The reaction mixture changes in color almost immediately to reddish-orange. The mixture is allowed to warm to 0° C. and the sulfur dioxide formed in the reaction is then removed under slight vacuum. The reaction mixture is then distilled and methane sulfenyl chloride is collected at 25° C./50 mm. Hg in a Dry-Ice isopropanol trap. The methyl disulfur chloride is collected at 29°–30° C./12 mm. Hg in a quartz receiver.

Example III.—Preparation of ethyl disulfur chloride

Materials: G.
Diethyl trisulfide (distilled) _____ 6.8 (0.044 M)
Sulfuryl chloride (distilled) _____ 5.9 (0.044 M)

The procedure for this preparation is identical to that of Example II except that the reaction is run at $-30°$ C. The first fraction is collected up to 30° C./13 mm. Hg. The ethyl disulfur chloride is collected at 30–32° C./13 mm. Hg.

Example IV.—Preparation of n-propyl disulfur chloride

Materials: G.
Di-n-propyl trisulfide (distilled) ___ 8.0 (0.044 M)
Sulfuryl chloride (distilled) _____ 5.9 (0.044 M)

The procedure of Example II is followed using the above materials. The first fraction is collected up to 33° C./12 mm. Hg and the n-propyl disulfur chloride is collected at 34–36° C./12 mm. Hg. In each of Examples II–IV, bromine or chlorine can be substituted in equivalent amounts for the sulfuryl chloride to obtain the corresponding disulfur halide. Similarly, di-n-butyl or di-n-pentyl trisulfides may be used in place of the dimethyl, diethyl or dipropyl trisulfides, to give the corresponding n-butyl or n-pentyl disulfur halide.

Example V.—Preparation of methyl propenyl disulfide

To 0.93 g. (0.008 M) of methyl disulfur chloride (CH₃SSCl) cooled to −30° C. is added 25 ml. of an ethereal propenyl lithium solution at a rapid dropwise rate. The reaction mixture is then poured into 25 ml. of cold (10° C.) 0.1 N hydrochloric acid. After layer separation the aqueous phase is extracted with three, 10 ml. portions of ethyl ether. The combined ether extracts are washed with 25 ml. of 0.1 N hydrochloric acid and dried over anhydrous sodium sulfate. Solvent removal gives a dark brown oil which is fractionated by vapor/liquid chromatography. Repeated 100 lambda injections on a 10′ x ¼″ Carbowax 20 M on chromosorb WA/W, column, temperature programmed from 75 to 225° C. at 2°/min. gives separation of the isomers yielding a total 0.043 g. of cis and trans methyl propenyl disulfide. Analysis by a vapor/liquid chromatography—rapid scan mass spectrometry combination and NMR and IR data confirm the structure.

Example VI.—Preparation of n-propyl propenyl disulfide

The procedure of Example V is followed, except that 2.06 g. (0.0144 M) of n-propyl disulfur chloride and 35 ml. ethereal propenyl lithium solution were used. Isolation procedures of Example V give 0.04 g. of cis and trans n-propyl propenyl disulfides. The isomers are separated as described above and analyzed individually.

Analysis by vapor/liquid chromatography—rapid scan mass spectrometry combination, NMR and IR spectra confirm the structure.

Example VII.—Preparation of ethyl propenyl disulfide

Materials:
Ethyl disulfur chloride—3.58 g. (0.278 M)
Propenyl lithium in ether from Example I—40 ml.

This compound is prepared in the manner set forth in Example V.

G.L.C.—Mass Spec. detects two compounds of molecular weight 134, which are cis and trans ethyl propenyl disulfides which are collected and combined as described in Example VI.

Example VIII.—Preparation of methyl propenyl disulfide

Into a 250 ml. round bottom flask equipped with stirrer, condenser, nitrogen purge, calcium chloride drying tube and dropping funnel, are added 20 ml. tetrahydrofuran and 1.4 gms. magnesium turnings. A crystal of iodine and a few drops of methyl iodide with approximately 0.5 ml. of 1-bromo-1-propene are added to initiate the reaction which is indicated by the disappearance of the iodine color and the formation of a pale brown color. The remaining 1-bromo-1-propene is added in 20 ml. of tetrahydrofuran at a rate to maintain the reaction mass temperature between 40–45° C. The total amount of 1-bromo-1-propene added is 7.1 gms. The addition time is ½ hour. The reaction mass is then heated for one hour at 70–80° C. with continued stirring.

The reaction mixture is then allowed to cool to 40° C. with stirring. The propenyl magnesium bromide solution is then added dropwise to a solution of the methyl disulfur chloride (8.5 g.) in tetrahydrofuran chilled in a Dry Ice/isopropanol bath to −70° C. to −75° C. The addition is stopped when the reaction mixture turns dark brown. Isopentane (100 ml.) is added and the resulting mixture transferred to a separating funnel containing 100 ml. water. The water layer is separated and the organic layer washed with water (4×100 ml.), dried over Na₂SO₄ and the solvent removed to give 7.5 g. of dark colored oil. High vacuum distillation (.02– .05 mm. Hg) at room temperature gives 3.5 g. of material collected at −80° C. A 75 lambda sample (0.0839 g.) is subjected to vapor/liquid chromatography and gives 0.025 g. of a mixture of cis and trans methyl propenyl disulfide. The structures are determined by NMR, IR and Mass Spectra.

When the foregoing procedure is repeated using an equivalent amount of 1-chloro-1-propene in place of 1-bromo-1-propene similar results are obtained. Repeat of the above procedure using 12.0 g. of ethyl disulfur chloride gives after high vacuum distillation 4.2 g. vapor/liquid chromatography of 0.75 lambda (0.077 g.) of the mixture gives 0.032 g. of cis and trans ethyl propenyl disulfide. The structures are determined by NMR, IR and Mass Spectra.

Repeat of the above procedure using 13.6 g. of n-propyl disulfur chloride gives after high vacuum distillation 6.2 g. Vapor/liquid chromatography of 75 lambda (0.077 g.) of this mixture gives 0.028 g. of cis and trans propyl propenyl disulfide. The structure of these compounds is determined by NMR, IR and Mass Spectra.

Example IX.—Preparation of trisulfides (a) Methyl trisulfur chloride—
Materials:
3.5 gm. (0.044 moles) of HSSCH₃ (methyl hydroxisulfide)

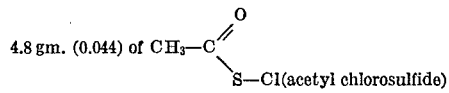
4.8 gm. (0.044) of CH₃—C(=O)—S—Cl (acetyl chlorosulfide)

Quartz equipment including a 10 ml. flask is heated for 1 hour at 105° C. in vacuo. After cooling, the joints are sealed with phosphoric acid (85%) and the entire system then flushed with dry hydrogen chloride gas.

The methyl hydrodisulfide is then added to the 10 ml. flask and cooled to −20° C. and the acetyl chlorosulfide is added with stirring. The mixture is then allowed to warm to 0° C. and the reaction mass is then subjected to a slight vacuum. The reaction mixture is then distilled and

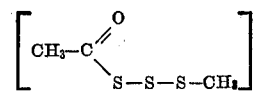
[CH₃—C(=O)—S—S—S—CH₃]

(acetyl methyl trisulfide) is collected under vacuum. The acetyl methyl trisulfide is then placed into a 10 ml. quartz flask and cooled to −35° C. Sulfuryl chloride (0.044 mole) is added while maintaining the reaction mass at −35° C. during the period of addition (30 minutes). Immediately subsequent to the addition, the reaction mass is allowed to warm to room temperature and SO₂ and acetyl chloride are removed.

The material remaining in the flask, methyl trisulfur chloride (CH₃SSSCl), is used in step (b).

When the above procedure is repeated using in place of the methyl hydrodisulfide equivalent amounts of other alkyl hydrodisulfides, the corresponding alkyl trisulfur chloride is obtained.

(b) Methyl propenyl trisulfide.—Into a 250 ml. round bottom flask equipped with stirrer, condenser, nitrogen purge, calcium chloride drying tube and dropping funnel are added the following ingredients:

20 ml. tetrahydrofuran;
1.4 gms. magnesium turnings.

A crystal of iodine and a few drops of methyl iodide with approximately 0.5 ml. of 1-bromo-1-propene are added to initiate the reaction which is indicated by the disappearance of the iodine color and the formations of a pale brown color. The remaining 1-bromo-1-propene is added in 20 ml. of tetrahydrofuran at a rate to maintain the reaction mass temperature between 40–45° C. The total amount of 1-bromo-1-propene is 7.1 gms. The addition time is ½ hour. The reaction mass is then heated for one hour at 70–80° C. with continued stirring and the reaction mixture cooled with stirring to 0° C. via an ice bath. The stirring is continued to keep the reagent in suspension. The trisulfur chloride obtained in step (a) is then added fairly rapidly from the dropping funnel. As more is added, the reaction mixture becomes more liquid and dark brown in color. The reaction mixture is then washed twice with water and then filtered through sodium bicarbonate in order to dry it. The mass is concentrated in vacuum to a dark brown oil, containing methyl cis propenyl trisulfide and methyl trans propenyl trisulfide. These may be separated and isolated using vapor/liquid chromatographic techniques as previously described in Example I.

The corresponding trisulfides are obtained when equivalent amounts of other 1-bromo-1-alkenes are used in place of the 1-bromo-1-propene in the above procedure as well as when other alkyl trisulfur halides are used in place of the methyl trisulfur chloride. Thus, the use of propyl trisulfur chloride results in propyl propenyl trisulfide, 1-bromo-1-methyl-1-propene results in the appropriate alkyl (1-methyl propenyl) trisulfide and so on.

What is claimed is:

1. The method for preparing an alkyl-1-alkenyl sulfide of the formula:

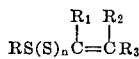

wherein R and $R_3$ are lower alkyl, $R_1$ and $R_2$ are hydrogen or lower alkyl, and $n$ is 1 or 2 which comprises contacting a lower alkyl sulfur halide of the formula:

$$RS(S)_nX$$

wherein X is chlorine and bromine with an alkene of the formula:

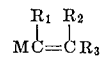

wherein M is lithium, —MgBr, or —MgCl.

2. The method according to claim 1 wherein $R_1$ and $R_2$ are hydrogen and $R_3$ is methyl.

3. The method according to claim 1 wherein R is methyl, ethyl or propyl.

4. The method according to claim 3 wherein $R_1$ and $R_2$ are hydrogen and $R_3$ is methyl.

5. The method according to claim 4 wherein $n$ is 1.

6. The method according to claim 4 wherein $n$ is 2.

7. The method according to claim 4 wherein X is chloro or bromo.

8. The method according to claim 4 wherein M is —MgBr.

9. The method according to claim 4 wherein said contacting is carried out at a temperature of from about −80° C. to room temperature.

References Cited

Reid: "Chemistry Bivalent Sulfur," vol. III (1960), p. 368.

CHARLES B. PARKER, Primary Examiner

D. R. PHILLIPS, Assistant Examiner

U.S. Cl. X.R.

260—665, 453, 543; 99—140